UNITED STATES PATENT OFFICE.

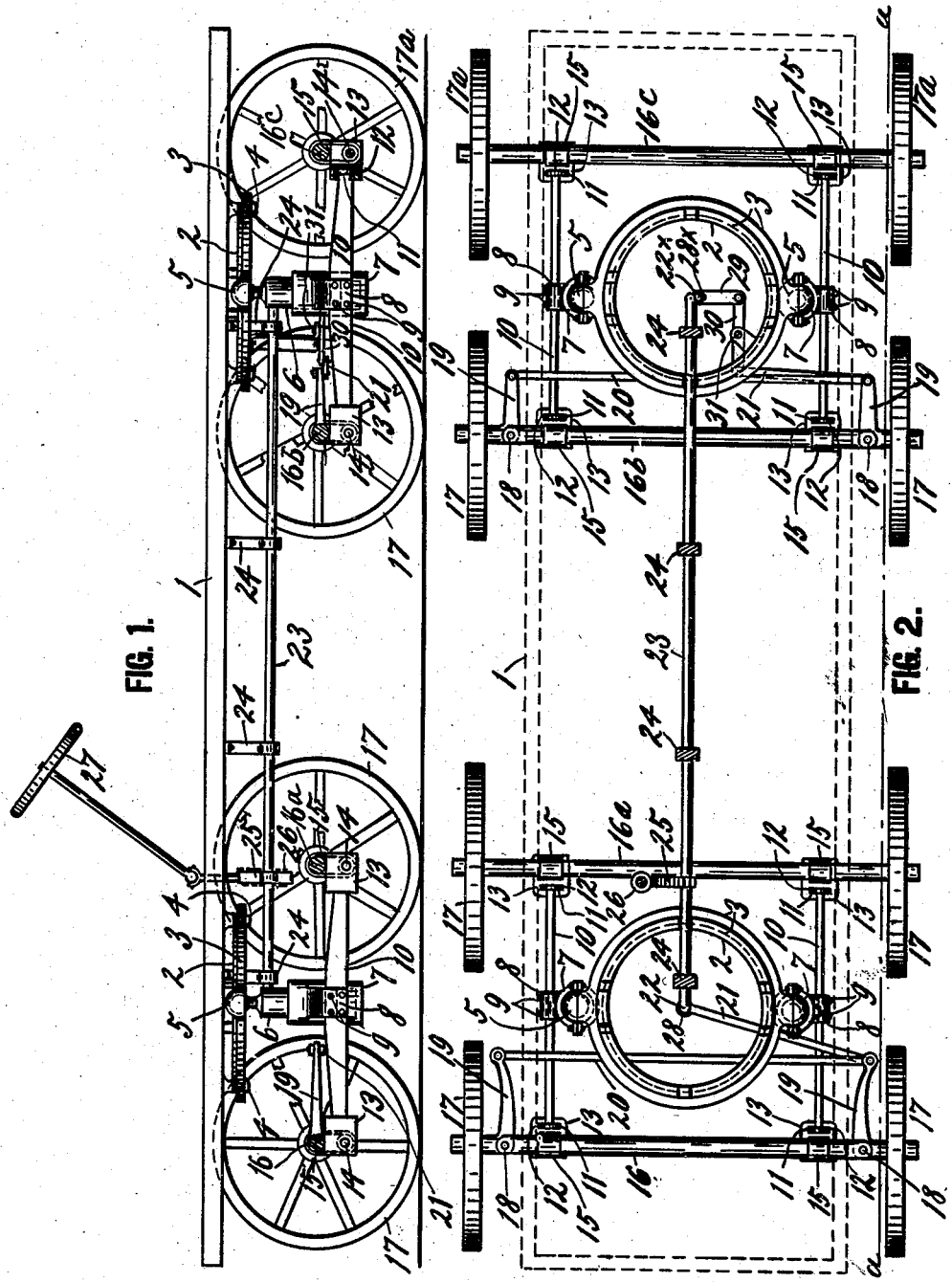

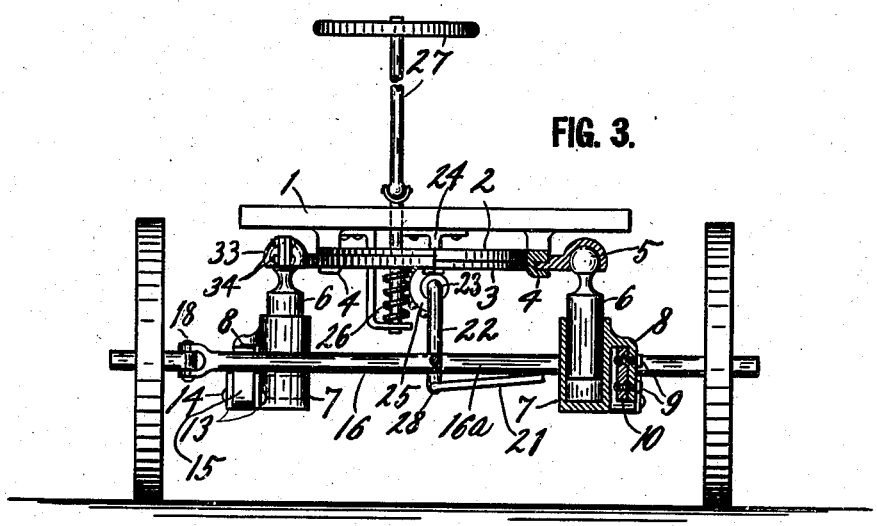

ARTHUR H. WRIGHT, OF SOUTH ST. PAUL, MINNESOTA.

AUTOMOBILE.

No. 885,822.  Specification of Letters Patent.  Patented April 28, 1908.

Application filed June 21, 1907. Serial No. 380,149.

*To all whom it may concern:*

Be it known that I, ARTHUR H. WRIGHT, a citizen of the United States, residing at South St. Paul, in the county of Dakota and State of Minnesota, have invented a new and useful Automobile, of which the following is a specification.

My invention relates to improvements in vehicles of all classes, and especially to automobiles.

The object of this invention is to provide easy running, durable and efficient vehicles of the class mentioned, and also to provide means that will dispense with pneumatic tires and springs in automobiles and similar vehicles.

In the drawings, Figure 1 is a sectional side elevation on the line $a-a$ of Fig. 2 and shows an automobile with my new mechanism applied thereto. Fig. 2 is a top or plan view of Fig. 1 but with the body or platform of the car shown in dotted lines. Fig. 3 is a front elevation with some parts in section. Fig. 4 is a top view and Fig. 5 a side view of the frame-supporting journals used in connection with my improvements. Fig. 6 is a sectional detail view of a fraction of the fifth-wheel and supporting sockets which comprise part of my invention.

Referring to the drawing by reference numerals, 1 designates the body of an automobile of any type, this body is supported by the upper rings of two fifth-wheels 2—3 (as best shown in Fig. 3); the upper ring 2, of each fifth-wheel being secured to the body or platform 1, and having lugs 4 taking below the lower ring 3; and the latter ring is supported by the globular heads 5 of plungers 6 inserted downwardly into cylinders 7, having each a side arm 8 secured by bolts 9 to longitudinal supporting bars 10, whose ends are provided with disk-shaped heads 11, resting in sockets 12 in clips 13, pivoted at 14 to pendants or hangers 15, depending from four axles 16, $16^a$, $16^b$, and $16^c$, the ends of which are supported by eight ground wheels 17, and $17^a$, of which only the two rear ones, $17^a$, are fixed on the shaft and serve as drivers when their axle is revolved by any mechanism and motor (not shown) the other six wheels are journaled on the axles.

By any suitable pumping device and an air reservoir (not shown) the engine or motor of the automobile keeps the cylinders 7 at all times supplied with compressed air, which supports the plungers and by them the body of the vehicle with all its contents, in such a cushioned manner that no springs or pneumatic tires are necessary.

In further explaining the construction, it will be seen that the two rear axles, together with the supporting bars 10 between them, form a rear truck while the two front axles 16 and $16^a$ and their bars 10 form a front truck. Each truck supports one of the fifth-wheels, and is steered by having its front axle provided with joints 18, and the skeins of each axle provided with rocker arms 19, connected together by a transverse bar 20, and one of them by a link 21 to depending rocker arms 22 and $22^\times$ of a rock shaft 23, rocked in bearings 24 by a toothed segment 25 fixed on the shaft and engaged by a worm screw 26 turned by the usual steering wheel 27.

The rocker arm 22 is connected to the link 21 by a ball-and-socket joint 28, normally in a central position below the front fifth-wheel, and the rocker arm $22^\times$ is likewise connected in central position below the rear fifth-wheel, by a ball-and-socket joint $28^\times$ to a link 29, which is pivoted to one end of a beam-lever 30, fulcrumed at 31 to the lower ring of the fifth-wheel and has its other end pivoted to the inner end of the link 21, said beam lever being necessary to cause the rear truck to turn to the opposite side from that of the front truck and thus make the steering easy and quick.

The cylindrical or disk-like heads 11 at the ends of the supporting bars 10, and the joints 14, are to allow free motion of the parts when the wheels run and jump on uneven ground.

In Fig. 5 is shown a pin 35 for keeping the end of the bar 10 down in the socket. In said view it will also be understood that the flat ends or necks of the bars 10 are guided loosely in the vertical slots 12 so as to limit the rocking motion of the bars.

The ball-shaped form of the heads 5 of the plungers (as best shown in Fig. 6 and to the right in Fig. 3) is to allow the various motions required at said points, and it will be observed that the upper half and a portion of the lower half of each head is embraced by a socket 32, formed at each side of the lower ring of the fifth-wheel, and provided with a cap 33 secured by bolts 34 so as to be separable.

Having thus described my invention, what I claim is:—

1. In an automobile, the combination with a front and rear wheel-supported truck, of upright cylinders carried thereby, pistons or plungers in the cylinders, fifth-wheels supported upon the plungers and supporting the body of the vehicle, said plungers having at their upper ends ball-shaped heads embraced by sockets formed on the lower rings of the fifth-wheels.

2. In an automobile, the combination with a front and rear wheel-supported truck, of upright cylinders carried thereby, pistons or plungers in the cylinders, fifth-wheels supported upon the plungers and supporting the body of the vehicle, said trucks being each formed with two axles and four supporting wheels thereon and two longitudinal frame bars, each supporting one of the cylinders, hangers on the axles, clevises pivoted to the hangers and having sockets with vertical side slots, said supporting bars having at their ends heads resting in said sockets, and near the heads flat portions loosely guided in the slots for the purpose set forth.

3. In an automobile, the combination with a front and rear wheel-supported truck, of upright cylinders carried thereby, pistons or plungers in the cylinders, fifth-wheels supported upon the plungers and supporting the body of the vehicle, and means for steering the two trucks simultaneously in opposite directions.

In testimony whereof I affix my signature, in presence of two witnesses.

ARTHUR H. WRIGHT.

Witnesses:
R. W. WRIGHT,
W. E. BUCKETT.